Dec. 5, 1950   L. J. LAJOIE ET AL   2,532,726
BIRD FEEDER
Filed Oct. 16, 1946
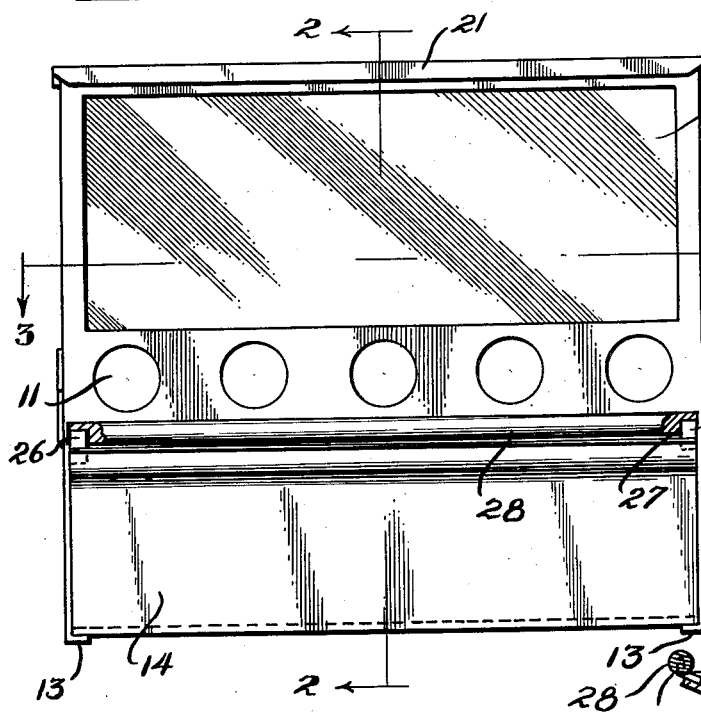
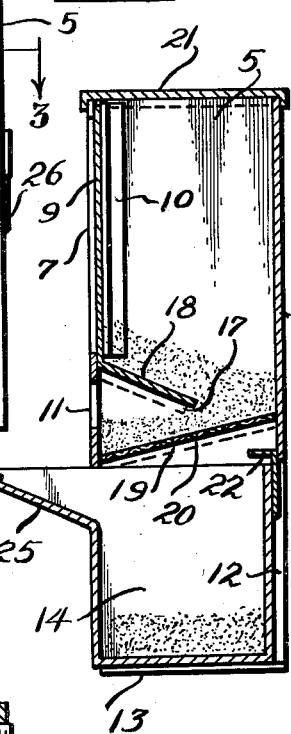
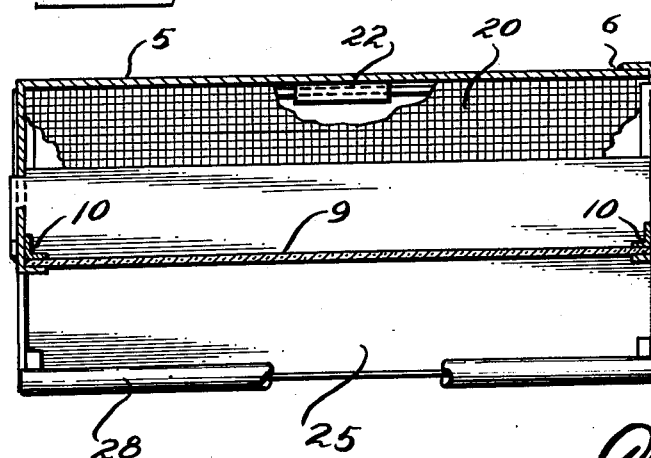
Inventor
Louis J. Lajoie and
Theodore F. Rosinski
By Clarence A. O'Brien
and Harvey B. Jacobson
Attorneys Patented Dec. 5, 1950

2,532,726

UNITED STATES PATENT OFFICE 2,532,726

BIRD FEEDER

Louis J. Lajoie, Belleville, and Theodore F. Rosinski, Elizabeth, N. J.

Application October 16, 1946, Serial No. 703,570

1 Claim. (Cl. 119—52)

The present invention relates to new and useful improvements in bird feeders and the primary object of the invention is to provide economical means for feeding a large number of birds in such a manner that the waste feed will be returned into a tray for recovering the waste feed and preventing loss thereof.

An important object of the invention is to provide a perch on which the birds may stand while feeding.

Another object of the invention is to provide a feeder of this character adapted to feed a large number of birds over a relatively long period, thus avoiding the constant refilling of the feeder and saving time for the bird raiser.

A still further object is to provide a feeder of this character constructed of metal and provided with a glass window to enable the bird raiser to observe the quantity of feed present in the seed chamber.

A still further object is to provide a device of this character of simple and practical construction, which is economical to manufacture, durable in construction and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of the invention.

Figure 2 is a vertical sectional view taken on a line 2—2 of Figure 1, and

Figure 3 is a horizontal sectional view taken on a line 3—3 of Figure 1 and with parts broken away and shown in section.

Referring now to the drawing in detail wherein for the purpose of illustration I have disclosed a preferred embodiment of the invention the numeral 5 represents a seed chamber which is constructed of one piece of sheet metal bent into a rectangular box and welded in the rear as shown at 6 in Figure 3.

The front wall 7 of the seed chamber is formed with a window opening 8 behind which is placed a glass plate 9 held in place by two vertical metal angle strips 10 welded or otherwise secured to the inside of the feeder at the front portion thereof.

Also in the front panel 7 below the window opening 8 are evenly spaced circular openings 11 through which the birds may feed.

The sides 12 of the seed chamber extend below the front and back panels and their lower edges 13 are bent inwardly to form flanges for seating a removable tray unit 14 thereon. Also located in each side of the feed chamber are two sloping slots 15 and 16, the slot 15 receiving the outer edges 17 of a sloping baffle 18 which are bent downwardly against the outside of the chamber, thus holding the baffle fixed in place and also support the lower edge of the glass 9 to prevent the glass from slipping downwardly.

The sloping slots 16 receive the outer edges 19 of a screen 20 positioned in the lower portion of the feed chamber, the outer edges of the screen likewise being bent downwardly to support the screen in position.

The use of the baffle 18 is to slow the feed coming into the seed chamber and to direct the feed to the upper end of the screen 20, thus causing a screening action of the feed as it moves by gravity toward the front of the seed chamber and causes the chaff and dust to settle through the screen and drop into the tray unit 14. A removable top 21 is placed on top of the seed chamber to supply the chamber with feed, when desired.

At the center and back of the seed chamber is welded a metal angle 22 which functions as a stop to prevent the tray unit from being pushed back too far under the screen.

The tray unit 14 is constructed of sheet metal and is slidably supported on the flanges 13 and may be removed by pulling the tray forwardly. The front wall of the tray slopes upwardly and projects forwardly of the seed chamber and has an angle member 26 welded at each end of the sloping wall to project vertically upwardly into recesses 27 at each end of a perch 28. The perch is thus positioned forwardly of the feed openings 11 in a convenient position for birds to reach the feed on the screen 20 and so that waste feed dropped by the birds will be caught in the tray and recovered.

The inside of the tray is easily accessible to the bird raiser for removing waste feed by merely pulling the tray forwardly, the flanges 13 allowing the tray to operate as a drawer and the angle 22 stopping the tray at its correct position when the tray is replaced.

In view of the foregoing description taken in conjunction with the accompanying drawings it is believed that a clear understanding of the construction, operation and advantages of the device will be quite apparent to those skilled in this art.

A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

We claim:

A bird feeder comprising a box-like feed chamber having an open bottom and downwardly extending sides, inturned horizontal flanges on the lower ends of the sides, a tray slidably supported on said flanges for positioning under the bottom of the chamber, a feed opening in one wall of the chamber, a screen supported in the bottom of the chamber above the tray and sloping downwardly toward the opening, a sloping baffle supported in the chamber above the lower edge of the screen to guide feed to the upper end of the screen to sift the feed as it moves toward the opening said baffle and said screen having their side edges received in openings in the sides of the chamber and formed with downwardly extending flanges to hold the baffle and screen stationary in the chamber, and a perch supported on the tray adjacent the opening.

LOUIS J. LAJOIE.
THEODORE F. ROSINSKI.

REFERENCES CITED

The following references are of record in the file of this patent:

UNITED STATES PATENTS

| Number | Name | Date |
|---|---|---|
| 1,234,054 | McCandlish | July 17, 1917 |
| 1,322,218 | Anderson | Nov. 18, 1919 |
| 1,395,849 | McCoy | Nov. 1, 1921 |
| 1,398,041 | Pfeifer | Nov. 22, 1921 |
| 2,031,874 | Butler et al. | Feb. 25, 1936 |
| 2,092,848 | Kermode | Sept. 14, 1937 |

FOREIGN PATENTS

| Number | Country | Date |
|---|---|---|
| 823,672 | France | Jan. 25, 1938 |